United States Patent
Xia et al.

(10) Patent No.: US 7,117,065 B1
(45) Date of Patent: Oct. 3, 2006

(54) METHOD FOR MODIFYING A STAMPING DIE TO COMPENSATE FOR SPRINGBACK

(75) Inventors: Zhiyong Cedric Xia, Canton, MI (US); Feng Ren, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/278,327

(22) Filed: Mar. 31, 2006

(51) Int. Cl.
*G06F 19/00* (2006.01)
*G05B 11/01* (2006.01)
*G06G 7/48* (2006.01)

(52) U.S. Cl. .......................... 700/146; 700/30; 700/71; 703/7

(58) Field of Classification Search .................. 700/29, 700/30, 31, 71, 97, 98, 108, 109, 118, 145, 700/146, 147, 165, 279; 703/1, 6, 7, 8; 702/182
See application file for complete search history.

(56) References Cited

U.S. PATENT DOCUMENTS

| | | | |
|---|---|---|---|
| 6,205,366 B1 * | 3/2001 | Tang et al. .................. 700/146 |
| 6,785,640 B1 * | 8/2004 | Lu et al. ........................ 703/7 |
| 6,947,809 B1 * | 9/2005 | Ren et al. ...................... 700/98 |
| 2003/0182005 A1 * | 9/2003 | Chu et al. .................... 700/165 |
| 2004/0073323 A1 * | 4/2004 | Zhu et al. ..................... 700/31 |
| 2004/0176863 A1 * | 9/2004 | Ren et al. ..................... 700/98 |

* cited by examiner

*Primary Examiner*—Leo Picard
*Assistant Examiner*—Charles Kasenge
(74) *Attorney, Agent, or Firm*—David B. Kelley; Artz & Artz

(57) ABSTRACT

A method for modifying a stamping die to compensate for springback includes the steps of stamping a first part using a base, or pre-existing die set, and creating a surrogate die having the shape of the first stamped part. These steps are followed by simulated stamping of a blank with the surrogate die, where the blank is shaped according to the desired finished part. Then, the base die is modified by mapping the forming stresses, from the stamped blank, to an indicator blank, which is allowed to relax and then is employed as a template for modification of the base die. Following this, the accuracy of the newly modified base die is determined by stamping a second part in the modified base die and by comparing a number of dimensions of the second part with a number of corresponding dimensions of the desired finished part.

7 Claims, 1 Drawing Sheet

METHOD FOR MODIFYING A STAMPING DIE TO COMPENSATE FOR SPRINGBACK

BACKGROUND OF THE INVENTION

The present invention relates to a method for using a software routine to determine modifications to metal stamping dies required to produce parts which meet design intent notwithstanding springback of the stamped material.

"Springback" is a phenomenon characterized by the regressive movement of stamped materials, particularly metals, following removal of a stamping from a press. In general, dies must be constructed to overbend materials, so as to produce finished parts meeting all required dimensional specifications. Springback compensation presents a major obstacle during stamping tool development, especially for lightweight materials such as aluminum and high strength steels. If not properly accommodated, springback may cause the shape of stamped panels or structures to deviate unacceptably from the intended design, rendering the stamped part unusable. As manufacturers of motor vehicles, in particular, move to the use of more aluminum, as well as higher strength steels, to save vehicle weight, the more pronounced springback tendencies affecting these materials adds as much as six months to the standard tooling development time of a vehicle manufacturer. This timing is incompatible with current market demands.

Known practices for compensating for springback primarily employ manual correction through an iterative, or trial-and-error, process. Thus, long years of experience are needed for an engineer to properly predict and correct for springback. This itself is a problem because materials such as aluminum and high strength steels have springback characteristics which are significantly different from those of mild steel—the staple material of vehicle bodies for more than one hundred years. The present invention provides a method for tooling design to accommodate shape distortions introduced by springback. Because the method may be completely computer based, it may be applied during early draw die development stages, without the necessity of a physical prototype.

SUMMARY OF THE INVENTION

A method for modifying a stamping die includes the steps of stamping a first part using a base die, creating a surrogate die having the shape of the first part, and using the surrogate die to simulate stamping of a blank which is shaped according to the desired finished part. Then, the base die is modified by mapping the forming stresses from an indicator blank which is dimensionally identical to the base die. The indicator blank is allowed to relax and deform, and is then used as a template to modify the base die. A second part is then stamped with the modified base die and compared with the desired finished part. This comparison includes a plurality of corresponding dimensions from the second part and the desired finished part.

The present method further includes additional steps in the event that the previously described dimensional comparison indicates that the second part is not sufficiently comparable to the desired finished part. These additional steps include simulating stamping of another blank shaped according to the desired finished part, using the surrogate die which has been modified to the shape of the second part, and further modifying the base die by mapping the forming stresses from the restamped blank. Then, a third part will be stamped using the further modified base die, and compared with the desired finished part. This process continues iteratively until the stamped part meets all of the required dimensional criteria of the desired finished part.

According to another aspect of the present invention, the first part which is stamped in the base die may be stamped either conceptually in a software simulation, or in a physical, pre-existing die set. Similarly, the surrogate die may be created as part of a software simulation or as a physical die set. The indicator blank is also contained in software.

It is an advantage of a method according to the present invention that the time required to make changes in stamping dies is greatly reduced, and this is particularly so in the case of dies used to form materials such as aluminum and high strength steels.

It is another advantage of a method according to the present invention that springback compensation may be built into dies quickly, even where a die designer having decades of experience is not available.

Other advantages, as well as features and objects of the present invention will become apparent to the reader of this specification.

DETAILED DESCRIPTION OF THE PREFERRED EMBODIMENTS

Figure 1:
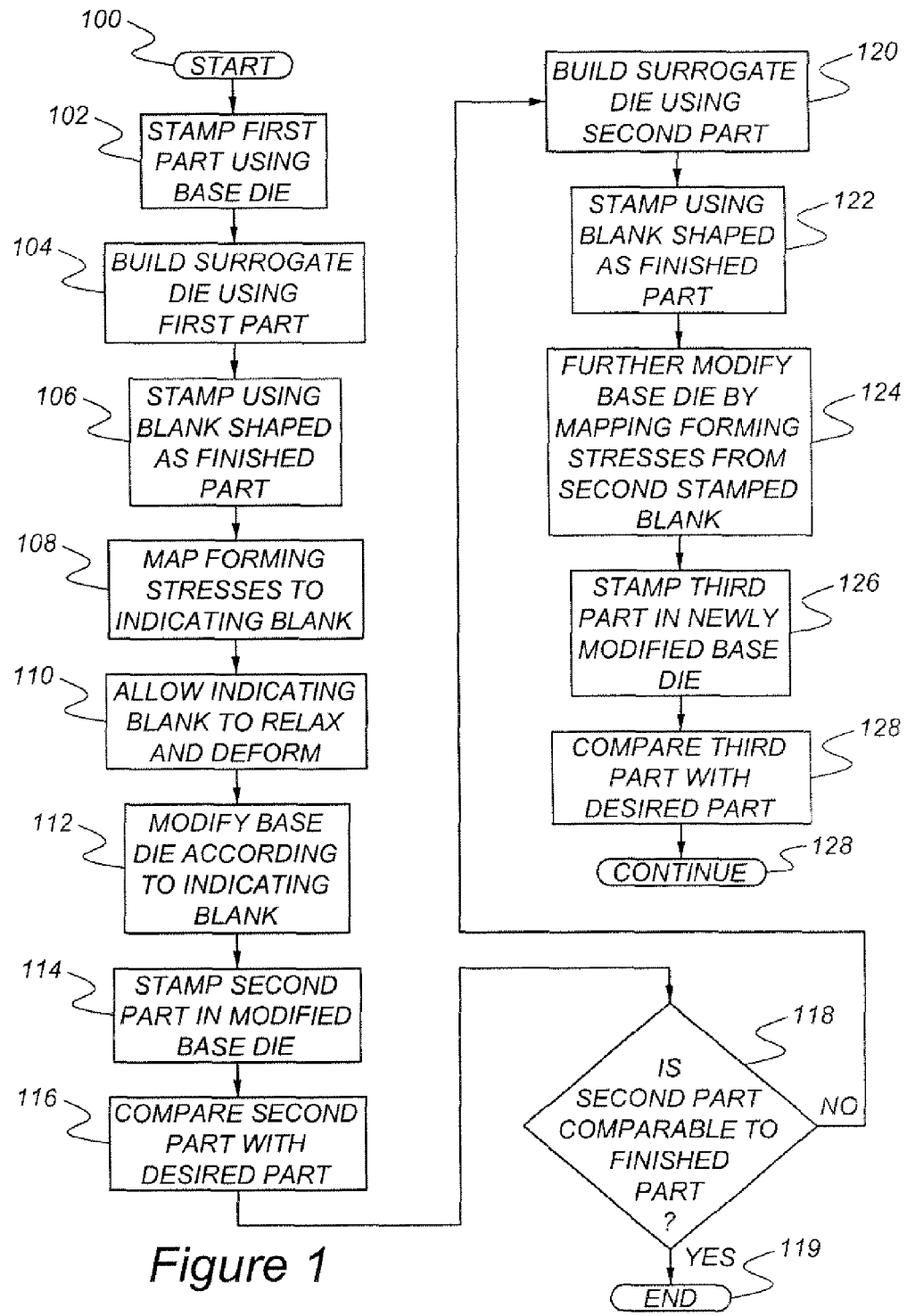
FIG. 1 is a flow diagram of a method according to the present invention.

As set forth in FIG. 1, the method according to the present invention starts at block 100. At block 102 a first part is stamped using a base, or preexisting, die. The stamping performed in block 102 may either be conceptual, in software, or by actually using a physical die set. Then, the routine moves to block 104, wherein a surrogate die, or, in other words, a second die, is constructed according to the profile of the part stamped at block 102. Then, at block 106 a blank which is shaped according to the precise dimensions of the desired finished part is stamped using the surrogate die.

At block 108, the forming stresses from the blank stamped at block 106 are mapped to an indicating blank shaped having the same dimensions as the base die. At block 110, the indicating blank is allowed to relax and deform and balance itself. Then, at block 112, the base die is modified by conforming the dimensions of the base die to the dimensions of the relaxed indicating blank. In essence, the indicating blank is used as a template for this modification step. In this manner, the surfaces of the base die are modified to compensate for the forming stresses produced in the stamping at block 106. Then, the routine moves to block 114 wherein a second part is stamped in the modified base die. At block 116 the second part is compared with the desired part in terms of a plurality of corresponding dimensions of the two parts. If the second part is comparable to the finished part, or, in other words, meets the desired dimensions within an acceptable tolerance, as determined at block 118, the routine ends at block 119. If, however, the tolerances are not met at block 118, the routine moves to block 120, wherein a second surrogate die is built or more properly, modified, using the second stamped part from block 114 as a template for building the surrogate die at block 120. Then, at block 122 a pressing is performed using a blank shaped as a finished part, once again with the die set being the modified base die. At block 124, the base die is modified by mapping forming stresses from the second stamped blank. Then, at block 126 a third part is stamped in the newly modified base die and compared at block 128 with the desired part. If the comparison indicates that the third part meets the requirements as imposed by the desired part, the routine will end. If the third part does not have the required dimensions, the routine will continue with further iterations at block 130.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. Method for modifying a stamping die to compensate for springback, comprising the steps of:
    stamping a first part in a base die;
    creating a surrogate die having the shape of said first part;
    simulating stamping of a blank, shaped according to a desired finished part, by said surrogate die;
    mapping the forming stresses from the stamped blank to an indicating blank having the same dimensions as the base die;
    allowing the indicating blank to relax, deform and balance itself;
    modifying the base die to have the dimensions of the relaxed indicating blank, by using the relaxed indicating blank as a modification template;
    stamping a second part in the modified base die; and
    comparing a plurality of dimensions of the second part with a plurality of corresponding dimensions of said desired finished part.

2. A method according to claim 1, further comprising the steps, in the case that said comparison indicates that the second part is not sufficiently comparable to the desired finished part, of:
    simulating stamping of a blank shaped according to said desired finished part, using said surrogate die which has been modified to have the shape of said second part;
    further modifying the base die by mapping forming stresses from the re-stamped blank;
    stamping a third part in the further modified base die; and
    comparing said third part to said desired finished part.

3. A method according to claim 1, wherein said first part is stamped in a software simulation.

4. A method according to claim 1, wherein said first part is stamped in a physical die set.

5. A method according to claim 1, wherein said surrogate die is created as part of a software simulation.

6. A method according to claim 1, wherein said surrogate die is created as a physical die set.

7. A method according to claim 2, further comprising the steps of continuing by comparing the third part with the desired finished part, and by re-modifying the base die in the event that the newly stamped second part is not sufficiently comparable to the desired finished part.

* * * * *